United States Patent
Swan

[11] Patent Number: 5,308,049
[45] Date of Patent: May 3, 1994

[54] TRANSMISSION HOLDING JIG

[76] Inventor: Alan R. Swan, Unit 10/113 Hunter Street, Hornsby, New South Wales 2077, Australia

[21] Appl. No.: 981,134

[22] Filed: Nov. 24, 1992

[30] Foreign Application Priority Data

May 24, 1990 [AU] Australia ............... PK0320

[51] Int. Cl.⁵ .............................................. B23Q 1/00
[52] U.S. Cl. ...................................................... 269/51
[58] Field of Search .......... 254/DIG. 16, 134, 133 R, 254/DIG. 4; 269/17, 296, 50, 51; 248/354.1, 357, 351, 346, 282

[56] References Cited

U.S. PATENT DOCUMENTS

| | | | |
|---|---|---|---|
| 1,016,914 | 2/1912 | Christiana | 269/51 |
| 1,026,932 | 5/1912 | Seddon | 269/51 |
| 1,446,811 | 2/1923 | Rowland | |
| 1,469,734 | 10/1923 | Staley | |
| 1,486,481 | 3/1924 | Cole | |
| 1,812,585 | 6/1931 | Collins | |
| 2,459,080 | 1/1949 | Killius | |
| 2,568,508 | 9/1951 | Montague | 269/51 |
| 2,879,059 | 3/1959 | Sandefur | |
| 4,993,686 | 2/1991 | Diaz | 254/DIG. 16 |
| 5,002,256 | 3/1991 | Bedford | 254/134 |
| 5,139,233 | 8/1992 | Goss | 254/134 |

FOREIGN PATENT DOCUMENTS

| | | |
|---|---|---|
| 371292 | 6/1990 | European Pat. Off. . |
| 325093 | 9/1920 | Fed. Rep. of Germany . |
| 638226 | 5/1938 | France . |
| 144929 | 1/1931 | Switzerland . |

*Primary Examiner*—Robert C. Watson
*Attorney, Agent, or Firm*—Ladas & Parry

[57] ABSTRACT

A jig (1) for holding a transmission casing (2) provided with boltholes (3) for mounting the casing to the jig comprises a pair of upright stanchions (4,5) coupled together via an extendible cross-bar (6). A first lateral extendible arm (13,14) is provided at the base of each stanchion, each first arm being rotatable about an axis passing longitudinally through the stanchion. A second lateral arm (21,22) is also provided at the base of each stanchion adjacent and parallel to the first arm and rotatable about the same axis, each of the first and second arms having a bracket (24,26) rotatably attached to an end of the respective arm. The brackets are arranged so as to lie substantially in the same plane, whereby boltholes (3) in different size casings (2) can be aligned with boltholes (28) provided in the brackets by appropriately extending the cross-bar and the first arms and by rotating the arms.

7 Claims, 1 Drawing Sheet

TRANSMISSION HOLDING JIG

This is a continuation-in-part of copending application International Application PCT/AU91/00210 filed on May 15, 1991 and which designated the U.S.

BACKGROUND OF THE INVENTION

This invention relates to jigs of the type used for holding heavy equipment, and more particularly to such jigs which are suitable for holding automobile automatic transmission casings.

It is known for transmission casings to be mounted on jigs when they are being worked on in a workshop or garage. However, hitherto it has been necessary to have a particular jig for each different type of transmission, as the casings, which are provided with boltholes for such mounting, are all different for each different make of car.

It is therefore an object of the present invention to provide a transmission holding jig which can hold different types of transmission casings.

SUMMARY OF THE INVENTION

Accordingly, the invention provides a jig for holding a transmission casing provided with boltholes for mounting the casing to the jig, the jig comprising a pair of upright stanchions coupled together via an extendible cross-bar, a first lateral arm provided at the base of each stanchion, each first arm being rotatable about an axis passing longitudinally through the stanchion and a second lateral arm provided at the base of each stanchion adjacent and parallel to the first arm and rotatable about the same axis, each of the first and second arms having a bracket rotatably attached to an end of the respective arm with the brackets being arranged so as to lie substantially in the same plane, whereby boltholes in different size casings can be aligned with boltholes provided in the brackets by appropriately extending the cross-bar and the first arms and by rotating the arms and brackets.

In a preferred embodiment of the invention, a screw-threaded clamp is provided within each stanchion for clamping the first and second arms after they have been rotated to the desired position.

The first arms preferably each comprise an outer member rotatable about the respective stanchion axis and an inner member slidable within the outer member for extension of the arm.

The brackets are preferably attached to the inner members of the first arms and, also preferably, clamping means are provided on each of the first and second arms for clamping the brackets after they have been rotated to the desired position.

Preferably also, one of the stanchions is provided with a connecting member for attaching the jig to a workbench or the like. In some cases, it may also be desirable for either the first or the second arms, or both, to be extendible.

BRIEF DESCRIPTION OF THE DRAWING

One illustrative embodiment of the invention will now be more fully described, by way of example, with reference to the drawings of which.

DETAILED DESCRIPTION OF ONE EMBODIMENT OF THE INVENTION

Figures 1, 2:
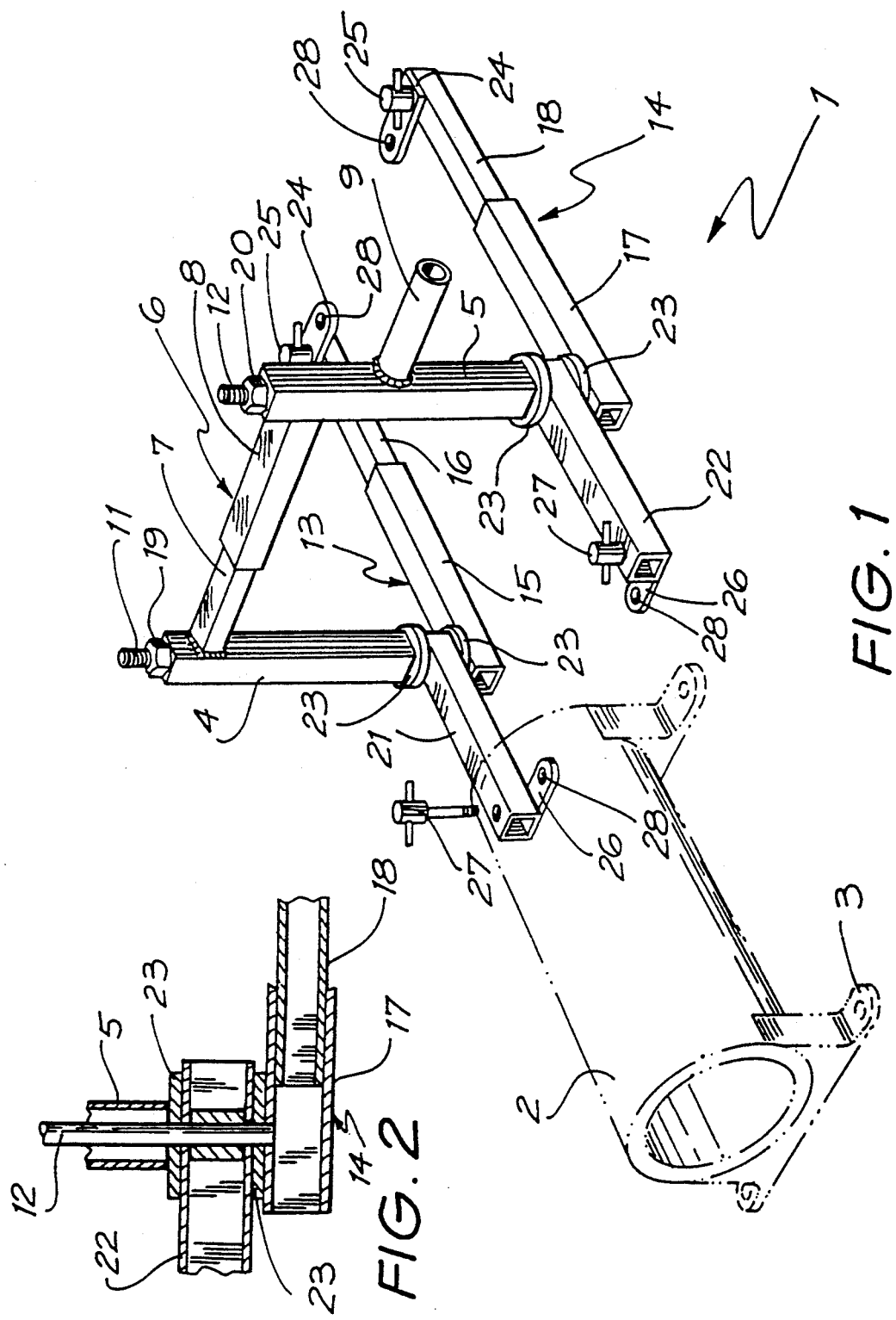
FIG. 1 is a perspective view of a jig according to the invention for holding a transmission casing.
FIG. 2 is a cross-sectional view through the lower part of half of the jig of FIG. 1.

Thus, as shown in the drawings, a jig 1 for holding a transmission casing 2 provided with boltholes 3, comprises main stanchions 4 and 5, which are extendibly coupled together by means of a cross-bar 6. The cross-bar 6 comprises a first member 7 attached to an upper part of stanchion 4 and a second member 8 attached to an upper part of stanchion 5 with the second member 8 being slidable within the first member 7 so as to vary the length of cross-bar 6, as required, according to the width of the transmission casing 2.

Stanchion 5 is also provided with a connecting member 9 extending in an opposite direction to that of the second member of the cross-bar 6 for mounting the jig 1 on a workbench (not shown) or the like. The connecting member 9 is of circular cross-section so that the angle at which the jig is mounted on the workbench can be easily varied. The connecting member 9 can be attached to stanchion 5 at any point of the stanchion, but is conveniently joined thereto at a point below the join of the cross-bar to the stanchion.

Each stanchion is formed of a hollow four-sided extrusion and is provided with a threaded bolt 11 and 12 passing longitudinally through each stanchion 4 and 5. Nuts 19 and 25 are arranged to be accessible from the top of each stanchion and the end of each bolt 11 and 12 is welded to a respective first extendible arm 13 and 14 provided at the lower end of each stanchion.

The first arms 13 and 14 extend perpendicularly from each stanchion and are rotatable about the axis of the respective stanchion so that they can be moved to any desired position. Once the arms are in the correct position for the particular casing to be mounted, the nuts 19 and 20 are tightened so that the arms are clamped in that position. First arm 13 comprises a four-sided outer tube 15 and a four-sided inner tube 16 which is slidable within outer tube 15 so as to extend the arm 13, as desired. Similarly, first arm 14 comprises a four-sided outer tube 17 and a four-sided inner tube 18 slidable within outer tube 17 so as to allow the length of arm 14 to be varied. In a preferred embodiment, clamping means are provided to clamp the outer and inner tubes together once the correct length has been reached. The clamping means may incorporate wedge means arranged on one of the tubes for ease of clamping.

The jig 1 is further provided with two four-sided second arms 21 and 22 arranged adjacent and parallel to the first arms 13 and 14, respectively, so that the second arms are rotatable about the same axis of the respective stanchion as the respective first arm. Accordingly the bolts 11 and 12 are arranged to pass through the respective second arms 21 and 22 before being attached to the respective first arm 13 and 14. If desired, spacer plates 23 are provided on either side of each second arm 21 and 22 which facilitate clamping of the arms as the bolts 11 and 12 are tightened, once the arms are in the correct position. The lower of the two spacer plates on each stanchion is preferably welded to the respective bolt and can be so welded at a distance from the respective first arms so as to produce a desired spacing between the first and second arms.

Provided on the upper side of the inner tube 16 and 18 of each first arm 13 and 14, adjacent the end thereof, is a bracket 24 to which the transmission casing 2 is to be mounted. The brackets are rotatable about an axis perpendicular to the upper side of the arms and can be clamped in position by means of clamps 25. Similar brackets 26 are provided on the lower side of each of the second arms 21 and 22, adjacent the ends thereof, and these brackets are similarly rotatable and can be clamped in position by clamps 27. By arranging for brackets 24 to be on the upper side of first arms 13 and 14 and for brackets 26 to be on the lower side of second arms 21 and 22, all the brackets are in substantially the same plane.

Each of the brackets 24 and 26 are provided with a bolthole 28 by which the transmission casing is mounted by extending cross-bar 6 and first arms 13 and 14 and by rotating first and second arms 13, 14, 21 and 22 and brackets 24 and 26 so that the boltholes in the brackets line up with the boltholes 3 in the transmission casing.

It will be appreciated that although a particular configuration of elements has been described, other configurations will be apparent to a person skilled in the art without departing from the scope of the invention. Furthermore, although the stanchions and arms have been described as being four-sided, it will be appreciated that they could be of any suitable cross-section and that the various clamps could be of any desired type.

What I claim is:

1. A jig for holding a transmission casing provided with boltholes for mounting the casing to the jig, the jig comprising a pair of upright stanchions coupled together via an extendible cross-bar, a first lateral arm provided at the base of each stanchion, each first arm being rotatable about an axis passing longitudinally through the stanchion and a second lateral arm provided at the base of each stanchion adjacent and parallel to the first arm and rotatable about the same axis, each of the first and second arms having a bracket rotatably attached to an end of the respective arm with the brackets being arranged so as to lie substantially in the same plane, whereby boltholes in different size casings can be aligned with boltholes provided in the brackets by appropriately extending the cross-bar and the first arms and by rotating the arms and brackets.

2. A jig according to claim 1, wherein a screw-threaded clamp is provided within each stanchion for clamping the first and second arms after they have been rotated to the desired position.

3. A jig according to claim 1 wherein the first arms are extendable.

4. A jig according to claim 1, wherein the first arms each comprise an outer member rotatable about the respective stanchion axis and an inner member slidable within the outer member for extension of the arm.

5. A jig according to claim 1, wherein the brackets are attached to the inner members of the first arms.

6. A jig according to clam 1, wherein clamping means are provided on each of the first and second arms for clamping the brackets after they have been rotated to the desired position.

7. A jig according to claim 1, wherein one of the stanchions is provided with a connecting member for attaching the jig to a workbench or the like.

* * * * *